United States Patent
Goldmann et al.

[11] Patent Number: 5,691,467
[45] Date of Patent: Nov. 25, 1997

[54] METHOD FOR MAPPING SURFACES ADAPTED FOR RECEIVING ELECTRICAL COMPONENTS

[75] Inventors: Lewis S. Goldmann, Bedford; Emanuele F. Lopergolo, Marlboro, both of N.Y.

[73] Assignee: International Business Machines Corporation, Armonk, N.Y.

[21] Appl. No.: 672,881

[22] Filed: Jun. 28, 1996

[51] Int. Cl.[6] .................................................. G01B 7/28
[52] U.S. Cl. .................................................. 73/105
[58] Field of Search ............... 73/104, 105; 324/754, 324/756, 759

[56] References Cited

U.S. PATENT DOCUMENTS 4,027,935  6/1977  Byrnes et al. .
4,414,747  11/1983  Fale, Jr. et al. ............... 73/104
4,918,374  4/1990  Stewart et al. ............... 324/697

FOREIGN PATENT DOCUMENTS 2532117  2/1976  Germany ............... 73/105

*Primary Examiner*—Robert Raevis
*Attorney, Agent, or Firm*—Peter W. Peterson; DeLio & Peterson, LLC; Aziz M. Ahsan

[57] ABSTRACT

A method for mapping a surface adapted for receiving electrical components comprising the steps or providing a probe having a plurality of contacts, moving the probe toward the surface at a predetermined rate of speed, recording the time of all occurrences of contact between each of the probe contacts and the surface, determining the height of each portion of the surface contacted by one of the probe contacts, and correcting the height to account for non-planarity of the probe contacts.

22 Claims, 7 Drawing Sheets

METHOD FOR MAPPING SURFACES ADAPTED FOR RECEIVING ELECTRICAL COMPONENTS

BACKGROUND OF THE INVENTION

1. Field of the Invention

The present invention is related to a method for measuring the flatness of surfaces adapted for receiving electrical components.

2. Problem to be Solved

Multi-layer ceramic (MLC) substrates are well known in the art. Generally, an MLC substrate comprises ceramic layers and metal layers stacked to form a laminated (interdigitated) block in which the metal and ceramic layers alternate. With large and complex multi-layer ceramic substrate footprints, high yield flip chip-joining is highly dependent on the flatness of the substrate. Factors such as the substrate camber, local wariness and individual via-bulges contribute to joining difficulties. Such factors result from the substrate design, sinter parameters, and from random factors which are very difficult, if not impossible, to predict. For this reason, substrates with large and complex footprints frequently require a profile measurement on each individual substrate. Such profile measurements determine whether a substrate is accepted for joining, rejected or returned for flattening and retest. Generally, most substrates cannot be flattened more than once or twice.

Substrate flatness is usually measured by one of two conventional methods: (1) a surface trace (such as a Talysurf® or Tencor®) is formed across the chip diagonal or other selected track; or (2) a programmable contact or non-contact tool (such as a ViewTool®) records the height of a specified set of sites (typically 10–20) above some reference height. However, serious problems arise when either of these conventional methods are used. For instance, mapping only a subset of sites runs the risk of missing relatively high or low sites. The programmable method discussed above handles this to some extent by specifying input/output (I/O) pads which have been identified by some other tool as being relatively very high or very low. However, these locations may vary from one production run to another due to sintering and/or flattening. Furthermore, it has been found that it is not only the vertical distance between the highest- and lowest sites which determines joinability. However, this is usually how it is specified in order to be consistent with the limited measurement capability available. For instance, a very high and a very low I/O pad will pose a greater problem if the pads are adjacent rather than if widely separated. The hypothetical, ideal specification would probably involve a combination of local and global criteria, but such an ideal specification cannot be applied within reasonable costs and time.

Laser triangulation tools, such as Cyberscan®, have the capability of profiling an entire substrate surface with a multi-point grid, and with proper software, can produce a map showing the vertical position or height of each site on the substrate. However, this method may take over two hours per substrate which precludes its use in a manufacturing environment. Furthermore, initial capital costs are high.

The characteristics discussed above, i.e. camber, waviness, via bulges, are also inherent in printed wiring boards or circuit cards. Typically, profile measurements are required prior to soldering surface mounted components to the printed wiring boards or cards.

Bearing in mind the problems and deficiencies of the conventional testing methods, it is an object of the present invention to provide a method for mapping the height of every site on any prescribed footprint.

It is another object of the present invention to provide a method for mapping the flatness of substrates that automatically rates the substrate against any via-bulge criteria.

A further object of the invention is to provide a method for mapping the flatness of substrates that can be augmented to standard electrical tests for substrates.

It is yet another object of the present invention to provide a method for mapping the flatness of substrates that can be implemented in a manufacturing environment at relatively low costs and with relatively low time consumption.

It is yet a further object of the present invention to provide a method for mapping the flatness of printed wiring boards or circuit cards prior to soldering surface mounted components thereto.

Still other objects and advantages of the method of the present invention will in part be obvious and will in part be apparent from the specification.

SUMMARY OF THE INVENTION

The above and other objects, and advantages, which will be apparent to those skilled in the art, are achieved in the present invention which is directed to, in a first aspect, a method for mapping a surface adapted for receiving electrical components, comprising the steps of:

a) providing a probe having a plurality of contacts;

b) moving the probe toward the surface at a predetermined rate of speed;

c) recording the time of all occurrences of contact between each of the probe contacts and the surface;

d) determining the height of each portion of the surface contacted by one of the probe contacts; and e) correcting the height determined in step (d) to account for non-planarity of the probe contacts.

In a related aspect, the present invention is directed to a method for mapping a surface adapted for receiving electrical components, comprising the steps of:

a) providing a probe having a plurality of contacts;

b) calibrating the probe to determine any degree of non-planarity of the probe contacts;

c) moving the probe toward the surface at a first rate of speed;

d) decreasing the rate of speed at which the probe is moving to a second rate of speed when the probe contacts reach a predetermined distance from the surface;

e) recording the time when contact first occurs between at least one of the probe contacts and the surface;

f) recording the time of all subsequent occurrences of contact between the probe contacts and the surface;

g) determining the height of each portion of the surface contacted by one of the probe contacts;

h) correcting each height determined in step (g) to account for non-planarity of the probe contacts;

i) determining an ideal plane with which the surface may be compared; and j) correcting the height determined in step (h) to represent the distance from the ideal plane.

In a further aspect, the present invention is directed to a method for mapping a surface adapted for receiving electrical components, comprising the steps of:

a) providing a probe having a plurality of contacts;

b) calibrating the probe to determine any degree of non-planarity of the probe contacts;

c) moving the probe toward the surface at a first rate of speed;

d) decreasing the rate of speed at which the probe is moving to a second rate of speed when the probe contacts reach a predetermined distance from the surface;

e) recording the time when contact first occurs between at least one of the probe contacts and the surface;

f) recording the time of all subsequent occurrences of contact between the probe contacts and the surface;

g) determining the height of each portion of the substrate contacted by one of the probe contacts, the height being the product of the time measured in step (f) and the first rate of speed;

h) terminating recording step (f) upon the last occurrence of contact between a probe contact and the surface;

i) correcting each height determined in step (g) to account for non-planarity of the probe contacts;

j) determining an ideal plane with which the surface may be compared;

k) correcting the height determined in step (i) to represent the distance from the ideal plane; and l) determining whether the height determined in the correcting step (k) is within a predetermined range of heights.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

In describing the preferred embodiment of the present invention, reference will be made herein to FIGS. 1–4 of the drawings in which like numerals refer to like features of the invention.

Figure 1:
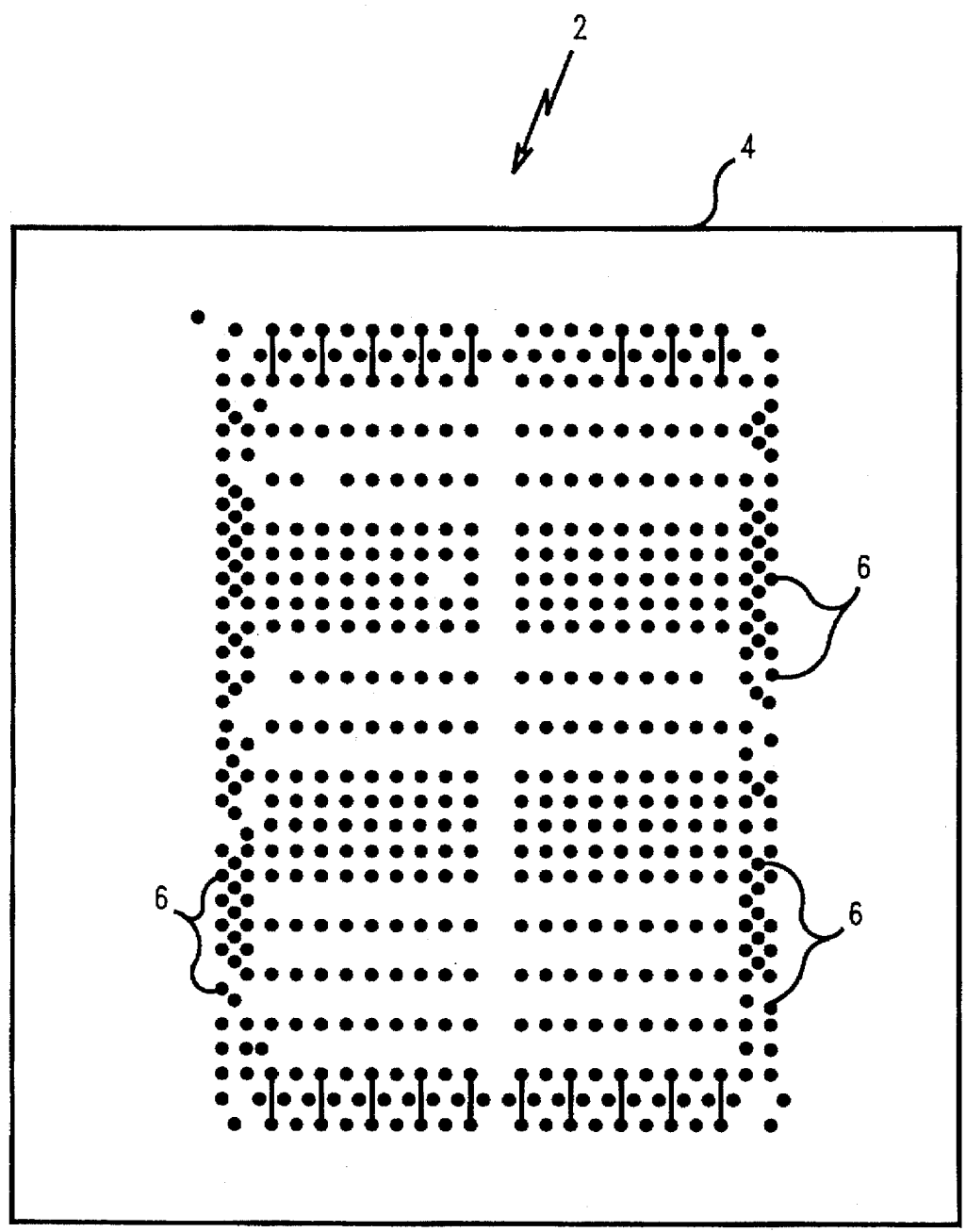
FIG. 1 is a top plan view of a chip I/O array of a typical multi-layer ceramic component.

FIG. 1 shows a top plan view of a typical MLC component which comprises substrate 2 and contact pads (I/O pads) 6 located at the periphery of substrate 2. An integrated circuit chip (not shown) is typically mounted in the center of substrate 4 and is connected to contact pads 6 via electrical conductors (not shown).

It is highly preferable that a spring contact-type probe be used to implement the method of the present invention. One type of spring contact-type probe that may be used is the subject of commonly owned U.S. Pat. No. 4,027,935, the disclosure of which is incorporated herein by reference. The probe disclosed in that patent comprises a probe head having a plurality of contacts extending therefrom for contacting the I/O pads of the substrate. Contact with the I/O pad acts as a circuit closing switch. Such a probe is also suitable for normal electrical tests and burn-in tests. Other types of spring contact probes may also be used.

The method for measuring the flatness of the substrate is preferably proceeded by a calibration test which takes into account the characteristics of the particular probe that is to be utilized, e.g. the non-planarity of the probe contacts. Thus, the calibration test measures the distance from each contact tip to a reference plane. i.e. a precision, flat datum. This data is stored in a data storage area, such as a computer memory, and is then used in the method for mapping the surface of the substrates. Preferably, the spring-contact type probe is maintained within its elastic limit so as not to require frequent recalibration. It is highly preferable that a flat, metallized glass plate be utilized as the precision, flat datum. Preferably, the calibration test is computer automated in order to reduce test time, improve accuracy and improve consistency of test results.

Figure 2:
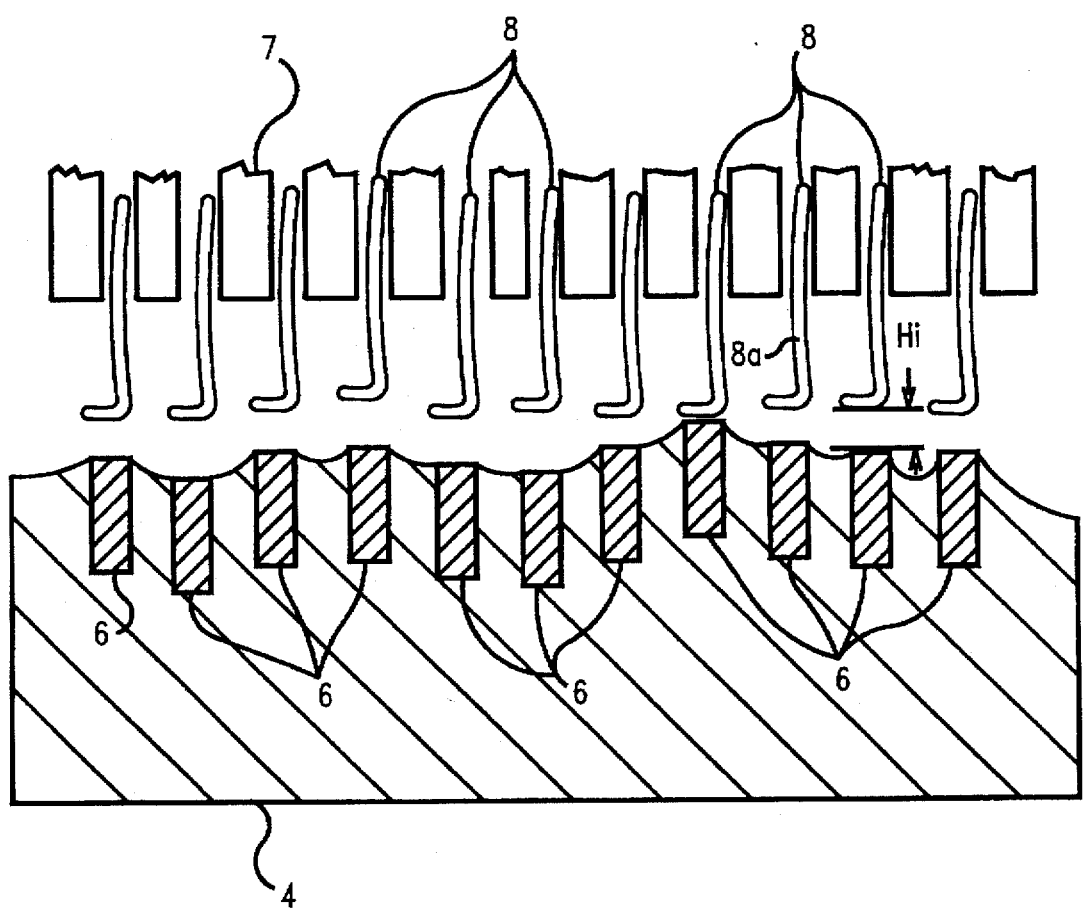
FIG. 2 is a partial view in cross-section of a probe in contact with input/output pads of a multi-layer ceramic component.
Figure 3A:
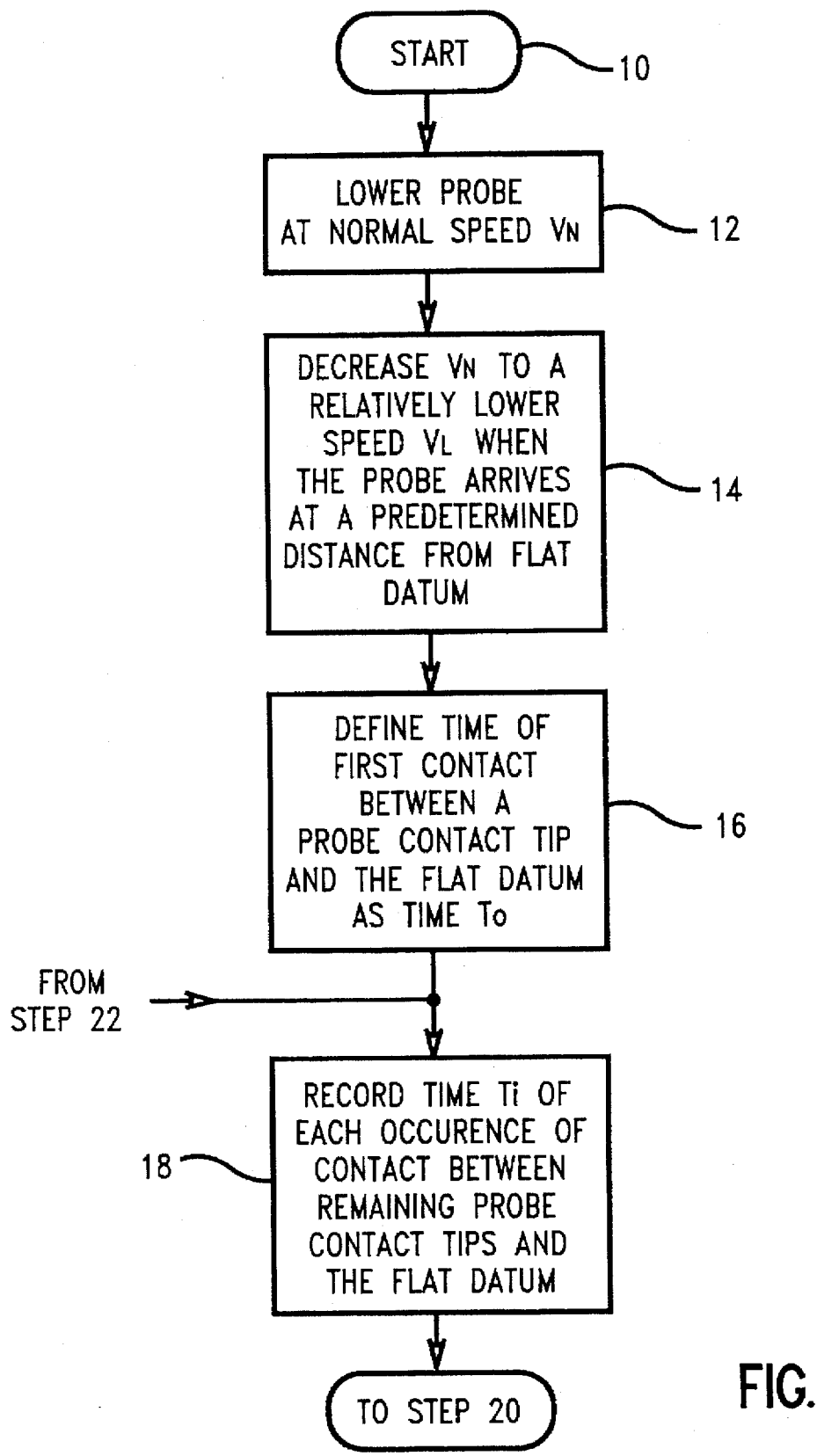
FIGS. 3A–3B are flow diagrams illustrating a calibration test procedure.
Figure 3B:
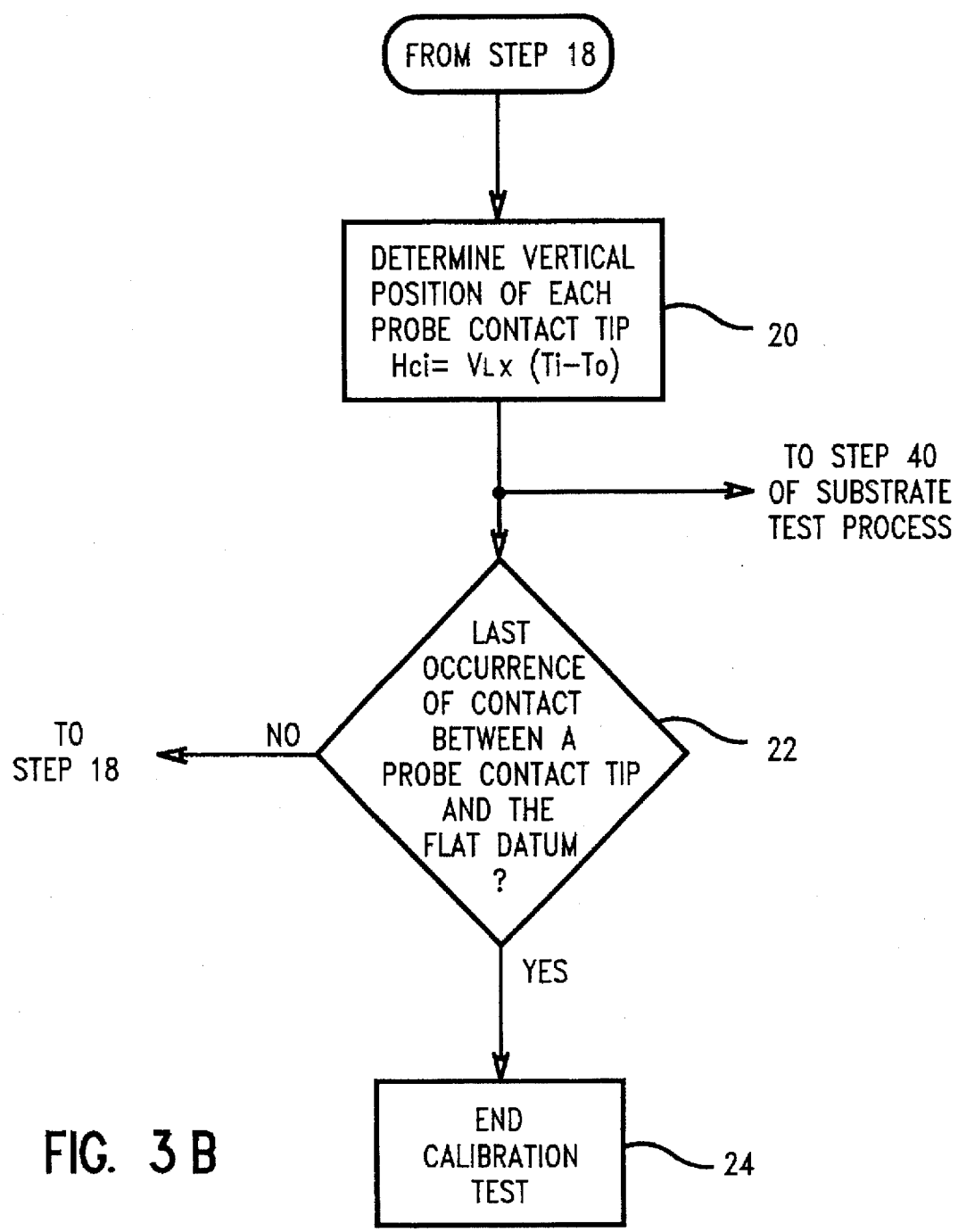
Figure 4:
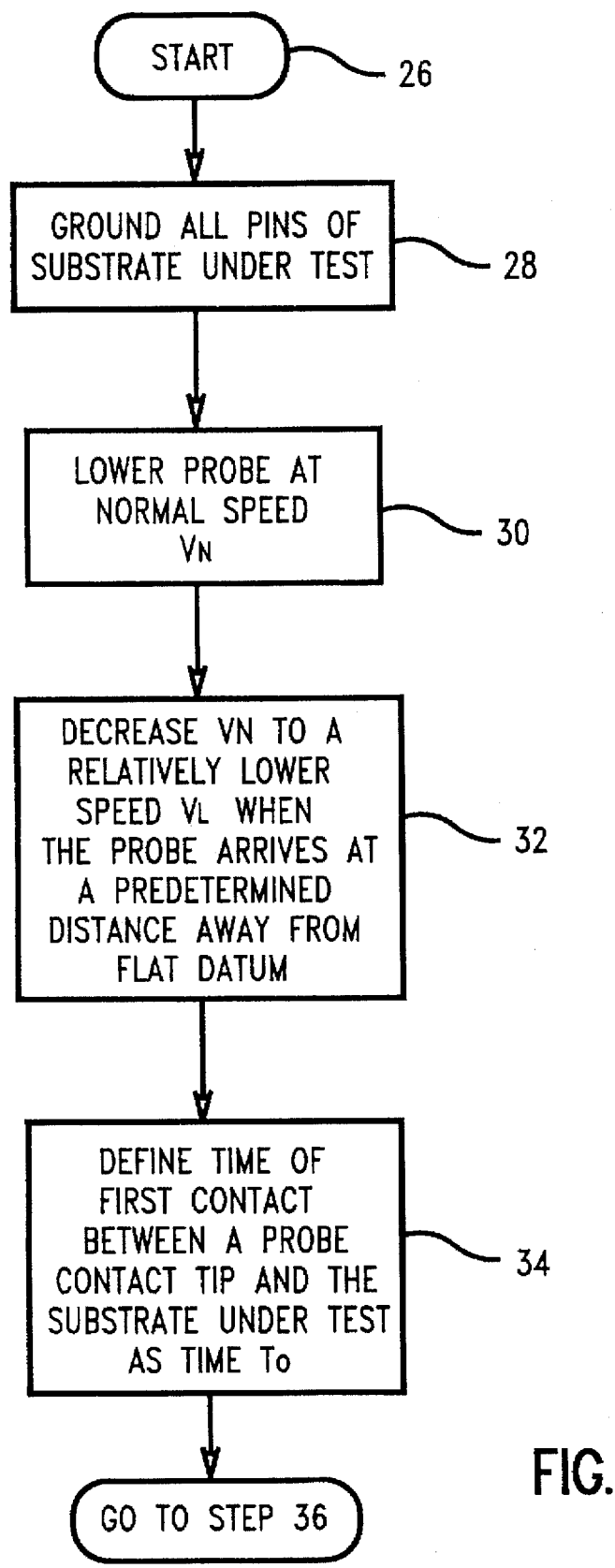
FIGS. 4A–4C are flow diagrams illustrating the method of the present invention.
Figure 4B:
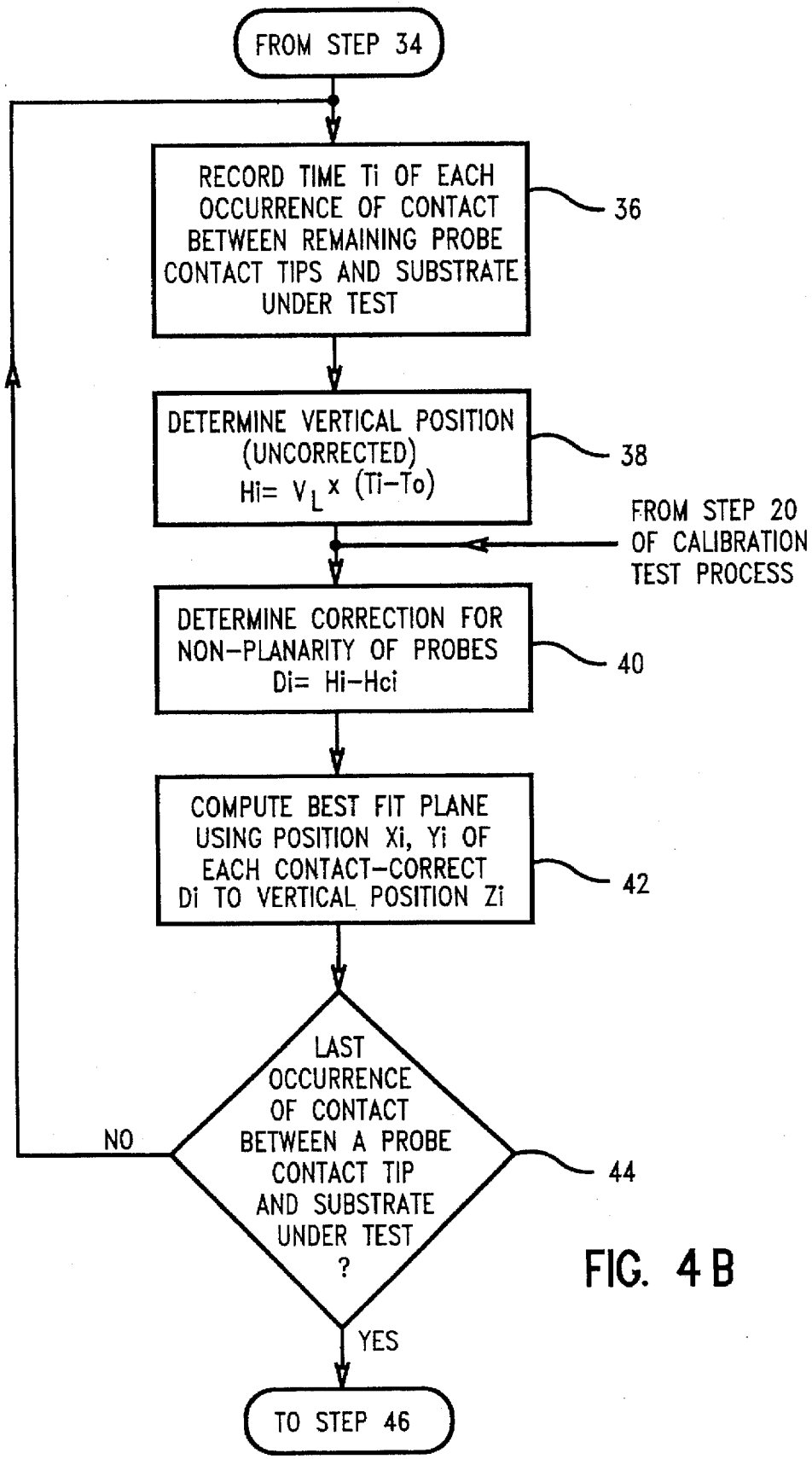
Figure 4C:
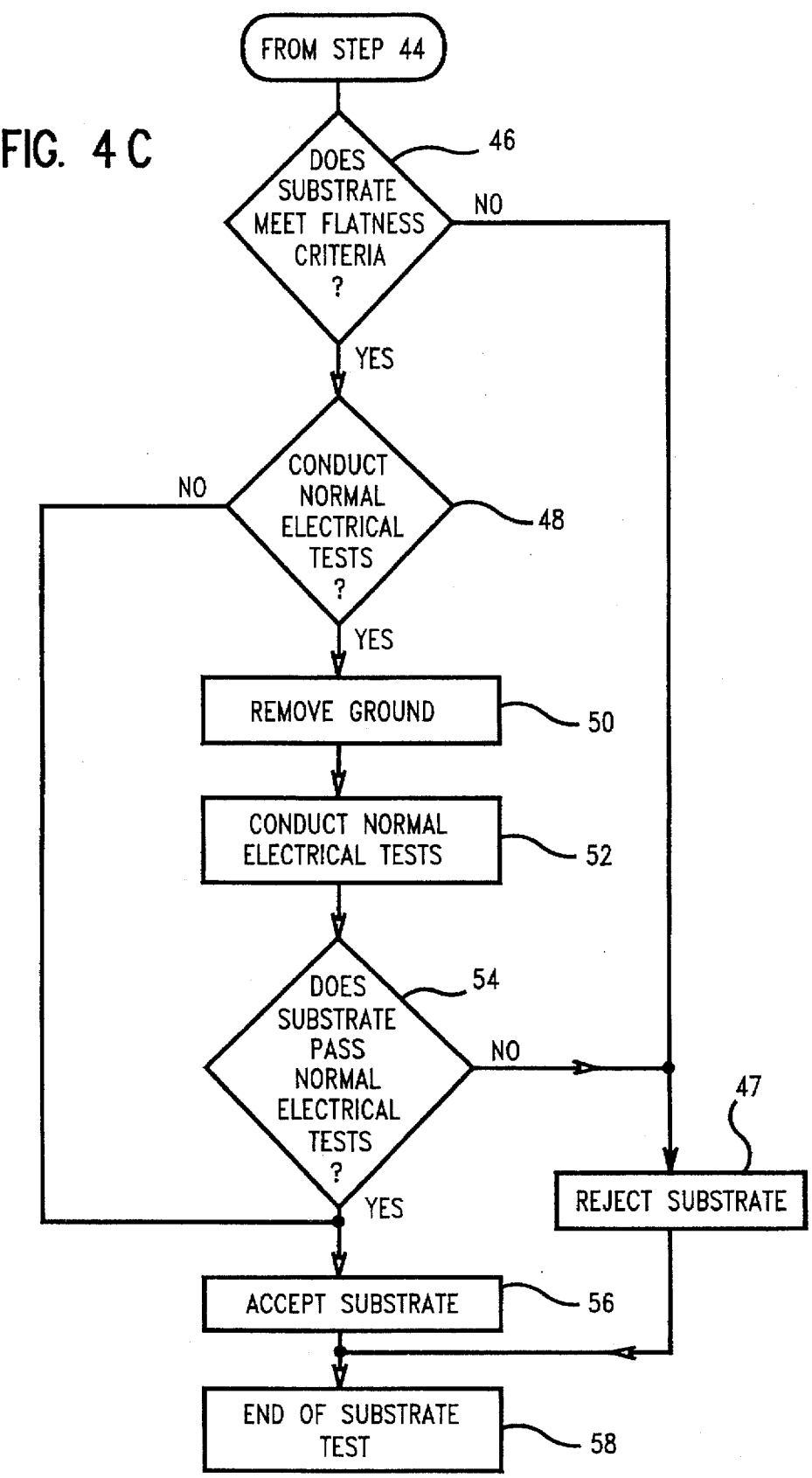

FIGS. 2 and 3A–3B show a flow diagram of the calibration method in the calibration method, as well as the method for mapping the surface of a substrate, printed wiring board or printed circuit card, the probe head 7 (see FIG. 2) is mounted to a screw drive apparatus (not shown) that comprises a coarse screw drive and a fine screw drive. The procedure starts at step 10. In step 12, the probe is lowered or moved at normal speed $V_N$ via the coarse screw drive toward the datum. Preferably, $V_N$ is between about 0.1 and 10 inches/second. More preferably, $V_N$ is about 1.0 inch/second. In step 14, the speed of the moving probe is decreased to a relatively low speed $V_L$ via the fine screw drive when the probe arrives at a predetermined distance above the substrate. Preferably, the predetermined distance is between about 1 and 2 millimeters. In a preferred embodiment, $V_L$ is about 50 micrometers/minute. Fine adjustment of probe position may also be effected in discrete steps. A linear encoder may be used for this purpose. In step 16, the time $T_O$ of initial or first contact between a probe contact and the flat datum is recorded. The recorded time of first contact is used as a reference for all subsequent occurrences of contact between probe contacts and the flat datum. The letter i represents each occurrence of contact between a probe contact and the flat datum where i=0 to M−1 where M is the total number of probe contact tips on the probe head and $T_O$ represents the time of initial contact. In step 18, the time $T_i$ of each occurrence of contact between the other probe contacts and the flat datum is recorded. Step 20 uses the data generated in step 18 to determine the vertical position HCi of each probe contact. The vertical position is determined by multiplying the speed $V_L$ time the time $T_i$ of each occurrence of contact ($H_{Ci}=V_L \times (T_i-T_O)$). The data generated in step 20 is used in step 40 of the mapping method of the present invention which is discussed below. In step 22, measurement of time $T_i$ is concluded at time $T_{M-1}$ which is the last occurrence of contact between a probe contact and the flat datum. The calibration method ends at step 24. All timing functions used in the calibration method may be realized through the use of internal clocks of the computer, microprocessor or controller used to implement the calibration method.

In an alternate embodiment, the probe head is moved at $V_N$ until the probe contacts physically contact the flat datum. Then, the probe head is retracted a predetermined distance from the flat datum, and then moved again toward the flat datum only this time, at the rate of speed $V_L$. The time of initial contact between the probe contacts (which are moving at $V_N$) and the flat datum is not used to define time $T_O$.

In a further embodiment, normal speed $V_N$ may be decreased to $V_L$ only upon electrical contact between the probe and the flat datum. This procedure may be accomplished by using a probe head that has one (1) probe contact significantly longer than the other probe contacts. When this longer probe contact physically contacts the flat datum, the screw drive is automatically adjusted to move the probe at $V_L$. The time at which the long probe contact physically contacts the flat datum is disregarded and is not used to define time $T_O$.

Either of these alternate embodiments for changing $V_N$ to $V_L$ may also be used on the mapping method of the present invention which is described in detail below.

Referring to FIGS. 2 and 4A–4C, the mapping method starts at step 26. Although the ensuing description pertains to mapping the surface of a substrate, the method of the present invention may also be used to map the surfaces of printed wire boards or printed circuit cards. In step 28, the pins of the substrate, which are electrically connected to each I/O pad 6 of the substrate, are coupled or connected to electrical ground. If the I/O is relatively large (approximately 0.010" square or larger), a probe with double contacts may be used so that the detection circuit is closed when contact is made. For small I/Os, however, which are typical of MLC substrates, commercially available probe springs are too large to permit double contacts. In this situation, all I/Os must be grounded by grounding the entire pin array thereby allowing a single spring contact to close the detection circuit.

In step 30, probe 7 is lowered or moved at normal speed $V_N$ toward the substrate via the coarse screw drive. Preferably, $V_N$ is between about 0.1 and 10 inches/second. More. preferably, $V_N$ is about 1.0 inch/second. In step 32, the speed of the moving probe is decreased to a relatively low speed $V_L$ via the fine screw drive when the probe arrives at a predetermined distance above the substrate. Preferably, the predetermined distance is between about 1 and 2 millimeters. In a preferred embodiment, $V_L$ is about 50 micrometers/minute. Fine adjustment of probe position may also be effected by discrete steps. A linear encoder may be used for this purpose. A single intermediate speed may be used in place of $V_N$ and $V_L$ to move the probe toward the substrate surface.

In step 34, the time $T_O$ of initial or first contact between a probe contact and the substrate is recorded. Referring to FIG. 2, probe contact 8a is the first probe contact to contact an I/O pad. The recorded time of first contact is used as a reference for all subsequent occurrences of contact between probe contacts and substrate I/O pads 6. The letter i represents each occurrence of contact between a probe contact and the substrate where i=0 to M−1 and where M is the total number of probe contacts on the probe head 7 and $T_O$ represents the time of initial or first contact.

In step 36, the time $T_i$ of each occurrence of contact between each of the remaining probe contacts and the substrate is recorded. In this step, i=1 to M−1 since i=0 refers to the initial contact between probe contact 8a and an I/O pad. Thus, step 36 effects the recordal of the time or encoded step at which each via bulge is contacted and arithmetically translates the recorded time to vertical travel. Next, step 38 determines the vertical position of each portion (site) of the substrate contacted by a probe contact. The vertical position is the product of the initial speed $V_L$ and the time $T_i$ of each occurrence of contact between a probe contact and an I/O pad. Thus, the vertical position or height of each site is represented by the formula $H_i = V_L \times (T_i - T_0)$.

In step 40, each height or vertical position $H_i$ is corrected to account for the non-planarity of the probe contacts. This is accomplished by reducing each height $H_i$ by the vertical position of each corresponding probe contact $H_{Ci}$. $H_{Ci}$ was previously calculated in step 20 of the calibration method. Thus, the corrected vertical position of each site is represented by the formula $D_i = H_i - H_{Ci}$ where $D_i$ is the corrected vertical position of the site.

In step 42, an ideal or perfect plane is calculated based on each corrected height $D_i$. In a preferred embodiment, this step is implemented using the least squares method and the two (2) dimensional coordinates $X_i$, $Y_i$ of each site. The coordinates $X_i$, $Y_i$ of each site are measured with respect to the center of the substrate. Each corrected height or vertical position $D_i$ corresponding to a pair of coordinates $X_i$, $Y_i$ is then translated to a new vertical position or height $Z_i$ which represents the actual distance from the same coordinate position of the ideal plane. Translation to the ideal or least squares plane is made by the following formula:

$$Z_i = D_i - (aX_i + bY_i + c)$$

where a, b and c are computed by simultaneous solution of the following equations:

$$a\Sigma X_i^2 + b\Sigma X_i Y_i + c\Sigma X_i = \Sigma X_i D_i$$

$$a\Sigma X_i Y_i + b\Sigma Y_i^2 + c\Sigma Y_i = \Sigma Y_i D_i$$

$$a\Sigma X_i + b\Sigma Y_i + cM = \Sigma D_i$$

where all summations $\Sigma$ are from i=0 to M−1.

Step 44 determines whether there has been a final occurrence of contact between a probe contact and a substrate site. If there has not been a final occurrence, the method repeats steps 36 through 44. Once there has been a final occurrence of contact between a probe contact and the substrate surface, the method shifts to step 46. Step 46 compares the vertical position or height $Z_i$ of each substrate site to a predetermined flatness criteria. If the vertical positions $Z_i$ of the substrate sites do not meet the predetermined criteria, the method shifts to step 47 which effects rejection of the substrate. The method then ends at step 58.

If in step 46, it is determined that the vertical positions $Z_i$ of the substrate sites do meet the predetermined criteria, the method shifts to step 48 which determines if normal electrical tests are to be conducted. Such tests would include tests for locating short circuits or open circuits. Other tests may also be included. If step 48 determines that such tests are not to be performed, then the method shifts to step 56 which effects acceptance of the substrate. Step 58 then terminates the method. If step 48 determines that such tests are to be performed, then the method shifts to step 50 which effects decoupling or disconnecting the I/O pads from electrical ground. In step 52, the normal electrical tests are conducted. Next, step 54 then determines whether the substrate has passed all the normal electrical tests. If the substrate passes all the normal electrical tests, the method shifts to step 56 which effects acceptance of the substrate. Step 58 then terminates the method. If step 54 determines that the substrate did not pass at least one of the normal electrical tests, then the method shifts to step 47 which effects rejection of the substrate. The method is then terminated in step 58.

The data generated in any of the steps described above may be stored and processed in any desired manner. For example, data directed to the vertical position and location of each via-bulge may be outputted via any suitable computer printer. Specific data may also be located and outputted, such as the location of the via-bulges having the maximum or minimum vertical positions. Furthermore, any particular via-bulge data group may be outputted. Alternately, data pertaining to the entire array of via-bulge data may be outputted. Additionally, various data may be used to implement step 46 of the method which determines if the substrate meets certain criteria. The criteria may be of any form such as numerical data and/or Boolean data. The method of the present invention may be completely implemented in a significantly shorter amount of time, e.g. 1–2 minutes as compared to 2 hours or more for conventional methods thereby reducing testing time and associated costs.

While the present invention has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

I claim:

1. A method for mapping a surface adapted for receiving electrical components, comprising the steps of:
   a) providing a probe having a plurality of contacts;
   b) moving the probe toward the surface at a predetermined rate of speed;
   c) recording the time of all occurrences of contact between each of the probe contacts and the surface;
   d) determining the height of each portion of the surface contacted by one of the probe contacts; and
   e) correcting the height determined in step (d) to account for non-planarity of the probe contacts.

2. The method as set forth in claim 1 wherein step (b) further comprises the step of moving the probe at a second rate of speed when the probe reaches a predetermined distance from the surface.

3. The method as set forth in claim 2 wherein the predetermined rate of speed is significantly greater than the second rate of speed.

4. The method as set forth in claim 3 wherein the second rate of speed is between about 40 and 60 micrometers/minute.

5. The method as set forth in claim 2 wherein the predetermined rate of speed is between about 0.1 and 10 inches/second.

6. The method set forth in claim 1 further comprising a step (f) of determining an ideal plane with which the surface may be compared.

7. The method set forth in claim 6 further comprising a step (g) of correcting the height determined in step (e) to represent the distance from the ideal plane.

8. The method set forth in claim 7 further comprising the step of determining whether the height determined in the correcting step (g) is within a predetermined range of heights.

9. The method set forth in claim 1 wherein the recording step (c) is commenced upon the first occurrence of contact between a probe contact and the surface.

10. The method set forth in claim 1 wherein the recording step (c) is terminated upon the last occurrence of contact between a probe contact and the substrate surface.

11. The method set forth in claim 1 further wherein the height determined in determining step (d) is the product of the predetermined rate of speed and the time measured in recording step (c).

12. The method set forth in claim 1 wherein the corrected height determined in determining step (e) is the result of reducing the height determined in step (d) by the non-planarity of the probe contacts.

13. The method set forth in claim 1 wherein the moving step (b) comprises the steps of:
   moving the probe toward the surface at a first rate of speed until the probe contacts physically contact the surface;
   retracting the probe a predetermined distance away from the surface; and
   moving the probe toward the surface at a second rate of speed that is significantly slower than the first rate of speed.

14. The method as set forth in claim 1 wherein one of the probe contacts is significantly greater in length than the remaining probe contacts, the moving step (b) comprising the steps of:
   moving the probe toward the surface at a first rate of speed until the probe contact having the greatest length physically contacts the surface; and
   thereafter moving the probe toward the surface at a second rate of speed that is significantly slower than the first rate of speed.

15. The method set forth in claim 1 further comprising the step of calibrating the probe to determine any degree of non-planarity of the probe contacts.

16. The method set forth in claim 15 wherein the calibrating step comprises the steps of:
   a) moving the probe toward a substantially flat reference surface at a first rate of speed;
   b) decreasing the rate of speed at which the probe is moving to a second rate of speed when the probe reaches a predetermined distance from the reference surface;
   c) recording the time of all occurrences of contact between each of the probe contacts and the reference surface; and
   d) determining the vertical position of each of the probe contacts.

17. A method for mapping a surface adapted for receiving electrical components, comprising the steps of:
   a) providing a probe having a plurality of contacts;
   b) calibrating the probe to determine any degree of non-planarity of the probe contacts;
   c) moving the probe toward the surface at a first rate of speed;
   d) decreasing the rate of speed at which the probe is moving to a second rate of speed when the probe contacts reach a predetermined distance from the surface;
   e) recording the time when contact first occurs between at least one of the probe contacts and the surface;
   f) recording the time of all subsequent occurrences of contact between the probe contacts and the surface;
   g) determining the height of each portion of the surface contacted by one of the probe contacts;
   h) correcting each height determined in step (g) to account for non-planarity of the probe contacts;
   i) determining an ideal plane with which the surface may be compared; and
   j) correcting the height determined in step (h) to represent the distance from the ideal plane.

18. The method set forth in claim 17 wherein the recording step (f) is terminated upon the last occurrence of contact between a probe contact and the surface.

19. The method set forth in claim 17 further comprising the step of determining whether the height determined in the correcting step (j) is within a predetermined range of heights.

20. The method set forth in claim 17 further wherein the height determined in determining step (g) is the product of the first rate of speed and the time measured in recording step (f).

21. The method set forth in claim 17 wherein the corrected height determined in determining step (h) is the result of reducing the height determined in step (g) by the non-planarity of the probe contacts.

22. A method for mapping a surface adapted for receiving electrical components, comprising the steps of:
   a) providing a probe having a plurality of contacts;
   b) calibrating the probe to determine any degree of non-planarity of the probe contacts;
   c) moving the probe toward the surface at a first rate of speed;
   d) decreasing the rate of speed at which the probe is moving to a second rate of speed when the probe contacts reach a predetermined distance from the surface;
   e) recording the time when contact first occurs between at least one of the probe contacts and the surface;
   f) recording the time of all subsequent occurrences of contact between the probe contacts and the surface;
   g) determining the height of each portion of the surface contacted by one of the probe contacts, the height being the product of the time measured in step (f) and the first rate of speed;
   h) terminating recording step (f) upon the last occurrence of contact between a probe contact and the surface;
   i) correcting each height determined in step (g) to account for non-planarity of the probe contacts;
   j) determining an ideal plane with which the substrate surface may be compared;
   k) correcting the height determined in step (i) to represent the distance from the ideal plane; and
   l) determining whether the height determined in the correcting step (k) is within a predetermined range of heights.

* * * * *

UNITED STATES PATENT AND TRADEMARK OFFICE
CERTIFICATE OF CORRECTION

PATENT NO.   : 5,691,467
DATED        : November 25, 1997
INVENTOR(S)  : Goldmann et al.

It is certified that error appears in the above-identified patent and that said Letters Patent is hereby corrected as shown below:

In the Abstract:
On line 2, please delete "or" and substitute therefor -- of --.

In column 1, line 53, please delete "®" and substitute therefor -- ™ --

In column 5, line 48, please delete "$T_o$" and substitute therefor -- $T_0$ --
In column 4, line 48, please delete "$T_o$" and substitute therefor -- $T_0$ --
In column 4, line 54, please delete "$T_o$" and substitute therefor -- $T_0$ --
In column 5, line 3, please delete "$T_o$" and substitute therefor -- $T_0$ --
In column 5, line 13, please delete "$T_o$" and substitute therefor -- $T_0$ --
In column 5, line 56, please delete "$T_o$" and substitute therefor -- $T_0$ --

Signed and Sealed this

Seventh Day of April, 1998

Attest:

*Attesting Officer*

BRUCE LEHMAN
*Commissioner of Patents and Trademarks*